US010223632B2

(12) United States Patent
Carroll et al.

(10) Patent No.: US 10,223,632 B2
(45) Date of Patent: Mar. 5, 2019

(54) MODELING STATES OF AN ENTITY

(75) Inventors: Melissa Kristin Carroll, West Windsor, NJ (US); Guillermo Alberto Cecchi, New York, NY (US); Irina Rish, Rye Brook, NY (US)

(73) Assignee: International Business Machines Corporation, Armonk, NY (US)

( * ) Notice: Subject to any disclaimer, the term of this patent is extended or adjusted under 35 U.S.C. 154(b) by 1157 days.

(21) Appl. No.: 12/509,908

(22) Filed: Jul. 27, 2009

(65) Prior Publication Data
US 2011/0022369 A1 Jan. 27, 2011

(51) Int. Cl.
*G06N 3/02* (2006.01)

(52) U.S. Cl.
CPC ..................... *G06N 3/02* (2013.01)

(58) Field of Classification Search
None
See application file for complete search history.

(56) References Cited

U.S. PATENT DOCUMENTS

| | | | |
|---|---|---|---|
| 6,236,878 B1 | 5/2001 | Taylor et al. |
| 6,388,592 B1 | 5/2002 | Natarajan |
| 6,430,539 B1 | 8/2002 | Lazarus et al. |
| 2004/0073415 A1 | 4/2004 | Farhat |
| 2007/0027636 A1 | 2/2007 | Rabinowitz |

FOREIGN PATENT DOCUMENTS

JP 2004-094437 3/2004

OTHER PUBLICATIONS

Zou et al., Regularization and variable selection via elastic net, J.R. Statist. Soc. B, 2005, pp. 301-320.*
Formisano et al., Multivariate analysis of fMRI time series: classification and regression of brain responses using machine learning, Magnetic Resonance Imaging, 2008, No. 26, pp. 921-934.*
LaConte et al., Real-Time fMRI Using Brain-State Classification, Human Brain Mapping, 2007, vol. 28, pp. 1033-1044.*
Orchard et al., Simultaneous Registration and Activation Detection: Overcoming Activation-Induced Registration Errors in Functional MRI, Simon Fraser University, Apr. 2003, pp. 1-147.*
Bishop, CM, Pattern Recognition and machine learning, Springer, 2006, pp. 1-738).*
Yamashita et al., "Sparse estimation automatically selects voxels relevant for the decoding of fMRI activity parameters", Nueroimage, 2008 pp. 1414-1429.*
Robert Tibshirani, "Regression Shrinkage and Selection via the Lasso," J. R. Statist. Soc., Series B, 1996, pp. 1-28, vol. 58, No. 1.
H. Zou et al., "Regularization and Variable Selection via the Elastic Net," J. R. Statist. Soc., Series B, 2005, pp. 301-320, vol. 67, No. 2.
B. Efron et al., "Least Angle Regression," The Annals of Statistics, Jun. 2004, pp. 407-499, vol. 32, No. 2.
M. Yuan et al., "Model Selection and Estimation in Regression with Grouped Variables," J. R. Statist. Soc., Series B, Feb. 2006, pp. 49-67, vol. 68, No. 1.
G.A. Cecchi et al., "Inferring Brain Dynamics Using Granger Causality on FMRI Data," Proceedings of the IEEE International Symposium on Biomedical Imaging, May 2008, 4 pages.

* cited by examiner

*Primary Examiner* — Jason M Sims
(74) *Attorney, Agent, or Firm* — Vazken Alexanian; Ryan, Mason & Lewis, LLP (57) ABSTRACT

Methods, systems and apparatus for modeling states of an entity are presented. For example, a method, implemented on a processor device, of modeling one or more states of an entity is presented. The method includes obtaining a training dataset for training a model by applying a stimulus to the entity, forming a set of model parameters, and using the set of model parameters to form the model, such that the model is configured to predict at least one of the one or more states of the entity. At least one model parameter of the set of model parameters changes with time as a result of dependency of the at least one model parameter on the stimulus and as a result of time-dependency of the stimulus. The steps of obtaining the training dataset, forming the set of model parameters and using the set of model parameters are implemented on the processor device.

15 Claims, 3 Drawing Sheets

MODELING STATES OF AN ENTITY

FIELD OF THE INVENTION

The present invention relates generally to predictive modeling. More particularly the invention relates to model learning and predictive applications of brain activity.

BACKGROUND OF THE INVENTION

Recent advances in medical imaging technology have introduced functional magnetic resonance imaging (fMRI) capable of acquiring sequences of images of brain activity (data) by measuring changes in blood oxygenation levels. The acquired data may comprise a very large number of voxels or variables taken at many points in time.

Predicting mental states, including mental disease states, is a goal of brain studies. Indicating current mental states or predicting future mental states, including response to therapy, is useful in the treatment of mental diseases.

Key challenges in the analysis of biological data, including brain related data, are the very high dimensionality of the data, the temporal nature of underlying processes and the complicated, and not necessarily well understood, relationship between the environment or other stimuli and the state of the biological system, for example, the brain.

SUMMARY OF THE INVENTION

Principles of the invention provide, for example, methods, systems and apparatus for modeling states of an entity.

For example, a method, implemented on a processor device, of modeling one or more states of an entity is provided. The method includes obtaining a training dataset for training a model by applying a stimulus to the entity, forming a set of model parameters, and using the set of model parameters to form the model, such that the model is configured to predict at least one of the one or more states of the entity. At least one model parameter of the set of model parameters changes with time as a result of dependency of the at least one model parameter on the stimulus and as a result of time-dependency of the stimulus. The steps of obtaining the training dataset, forming the set of model parameters and using the set of model parameters are implemented on the processor device.

In accordance with another embodiment of the invention, a system, implemented on a processor device, for modeling one or more states of an entity is provided. The system comprises modules for implementing the above method of modeling states of an entity.

In accordance with yet another embodiment of the invention, apparatus for modeling one or more states of an entity is provided. The apparatus includes a memory and a processor coupled to the memory. The apparatus is operative to perform the above method of modeling states of an entity.

In accordance with one more embodiment of the invention, a computer program product for modeling one or more states of an entity is provided. The computer program product comprises a computer readable storage medium having computer readable program code embodied therewith. The computer readable program code comprises computer readable program code configured to perform the above method of modeling states of an entity.

Principles of the invention provides, for example, learning tasks, wherein a model representing fMRI data of brain scans learns parameters such that the model is useful in predicting mental or brain states; model parameters that evolve dynamically as functions of external time-dependent stimuli; efficient learning of a model that handles a large number of voxels via application of sparse regression using the Lasso method; indication of subsets of voxels or brain areas that are most relevant to prediction of future brain states; regression modeling with data samples that are not independent and identically distributed and form a multivariate time-series, and, using the Lasso method, treat regression parameters as time-varying random variables.

These and other features, objects and advantages of the present invention will become apparent from the following detailed description of illustrative embodiments thereof, which is to be read in connection with the accompanying drawings.

DETAILED DESCRIPTION OF THE INVENTION

Magnetic Resonance Imaging (MRI) is an imaging technique to visualize the internal structure and/or function of a body. MRI provides higher contrast between the different soft tissues of the body than provided by many other imaging techniques. Consequently, MRI is useful in neurology and brain imaging. MRI is also useful for imaging other portions of the body, for example, musculoskeletal, cardiovascular, and for oncological (cancer) imaging. MRI does not use ionizing radiation, but uses a powerful magnetic field to align the nuclear magnetization of, for example, hydrogen atoms in water in the body. Radio frequency (RF) fields are used to systematically alter the alignment of this magnetization, causing the hydrogen nuclei to produce a rotating magnetic field detectable by the scanner. This signal can be manipulated by additional magnetic fields to build up enough information to construct an image of the body or portions thereof.

Functional magnetic resonance imaging (fMRI) is a type of specialized MRI. fMRI, for example, measures the hemodynamic response (i.e., response to the dynamic regulation of the blood flow in the brain) related to neural activity in the brain or spinal cord of humans or other animals. Neurons require energy to function. This energy is supplied in the form of glucose and oxygen carried in hemoglobin. The blood supply of the brain is dynamically regulated to give active neural assemblies more energy while inactive neural assemblies receive less energy. Therefore, changes in blood flow and blood oxygenation in the brain (collectively known as hemodynamic) are closely linked to neural activity. When nerve cells are more active they consume more oxygen carried by hemoglobin in red blood cells from local capillaries. The local hemodynamic response to this oxygen utilization is an increase in blood flow to regions of increased neural activity, occurring after a delay of, for example, 1-5 seconds. This local hemodynamic response may rises to a peak over, for example, 4-5 seconds before falling back to near baseline levels, leading to local changes in the relative concentration of oxyhemoglobin and deoxyhemoglobin and changes in local cerebral blood volume in addition to this change in local cerebral blood flow. Therefore, fMRI may, for example, produce images of brain activity by measuring changes in blood oxygenation levels and/or other hemodynamic responses.

A voxel is a volume element, representing a value, a structure or a three-dimensional image on a three-dimensional grid. A voxel is analogous to a pixel, which represents two-dimensional image data. Voxels are frequently used in the visualization and analysis of medical and scientific data. As with a pixel, a voxel itself typically does not comprise spacial position or coordinates of the voxel. Rather, spacial position of a voxel is inferred based on the position of the voxel relative to other voxels (e.g., the position in the data structure that makes up a single volume image). The word voxel is a linguistic blend of the words volumetric and pixel.

The Least Absolute Shrinkage and Selection Operator (Lasso) method is a shrinkage and/or selection method for linear regression. The Lasso method may minimizes the usual sum of squared errors, with a bound on the sum of the absolute values of the coefficients. The Lasso may be associated with soft-thresholding of wavelet coefficients, forward stagewise regression, and boosting methods. The Lasso method is described in the paper: Tibshirani, R, *Regression Shrinkage and Selection via the Lasso*, J. Royal. Statist. Soc B., Vol. 58, No. 1, 1996, pages 267-288, the disclosure of which is incorporated herein by reference.

A Bayesian network is a probabilistic graphical model that represents a set of random variables and their conditional independencies via a directed acyclic graph (DAG). For example, a Bayesian network could represent the probabilistic relationships between diseases and symptoms. Given symptoms, the network could be used to compute the probabilities of the presence of various diseases. Bayesian networks are DAG with nodes representing variables and missing edges representing independencies between the variables. Nodes may represent random variables (i.e., random variables in a Bayesian sense) that may be, for example, observable quantities, latent variables (variables that are not directly observed but are inferred, e.g., through mathematical models, from other variables that are observed or measured), unknown parameters or hypotheses. Bayesian networks that model sequences of variables (e.g., speech signals or brain activity) are called dynamic Bayesian networks.

A Taylor expansion or a Taylor series is a representation of a function as an infinite sum of terms calculated from the values of its derivatives at a single point. The Taylor series may be regarded as the limit of the Taylor polynomials. In practice a Taylor expansion may be truncated to be of a certain order. Calculations of Taylor expansions or series and related Taylor coefficients are well known in the art and, therefore, will not be presented herein.

A sequence or other collection of random variables is independent and identically distributed (i.i.d.) if each random variable has the same probability distribution as the others and all are mutually independent.

The definition of an entity is something, living or otherwise, that could have its own separate and distinct existence. For example, an entity may be a brain, a person having a brain, an organism, an organism having a brain, or a biological system. Furthermore, an entity may be nonliving, for example, a network such as a communications or data network.

Exemplary embodiments of the present invention are described herein with reference to the field of fMRI to illustrate and provide a specific domain for application of the disclosed techniques. However, embodiments of the invention are applicable to other fields where predictive modeling or pattern extraction is desired. Some exemplary embodiments of the present invention relate to brain, brain states, brain activity and diseases of the brain. The invention is not so limited, other organs of a body, states, activities and diseases associated with other organs of the body are contemplated. Where embodiments, methods and techniques of the invention are applied to brain or brain states, activities or diseases, similar embodiments, methods and techniques of the invention may be applied to other organs or systems of the body or associated states, activities or diseases.

Key challenges in analysis of biological data, such as medical imaging (e.g., fMRI) include, the high dimensionality of data, the dynamic (e.g., temporal) nature of underlying processes, and the complicated relationship between different stimuli and a 'state of the biological system' that need to be modeled.

Embodiments of the invention are useful, for example, in processing large amounts of data, such as data produced in conjunction with or analysis of functional magnetic resonance imaging (fMRI). fMRI measurements can give rise to large amounts of data, for example, consisting of tens of thousands or hundreds of thousands of voxels and/or hundreds or thousands of samples, for example, time points or samples.

According to aspects of the invention, fMRI may be used to scan the brains of subjects, for example, while the brains are receiving stimuli or when brains are diseased or have other states. Embodiments of the invention provide for learning tasks, wherein a model representing fMRI data of brain scans learns (forms) parameters such that the model is useful in predicting mental or brain states.

According to aspects of the invention, fMRI data (e.g., time-series data collected at each voxel) may be used to predict the brain, mental or cognitive state of a subject, for example, an emotion (e.g., anger, happiness, sadness, anxiousness, or annoyance); extract patterns of or predict a mental disease, for example, schizophrenia, depression, Alzheimer's or dementia; discriminate between mental or brain states of a person, for example brain or mental states associated with a person looking at a face or at a building, a person listening to a phrase in a first language or a phrase in a second language, a person performing a mental or physical task or different mental or physical tasks, or a person having one or other emotion; and predicting brain activity given a specific stimulus or specific stimuli (e.g., auditory such as words or sounds, visual such as pictures, or activity of a person such as playing a video-game).

The term brain state, as used herein, comprises the mental or cognitive state of a subject, a mental disease state, a brain response to a stimulus, a brain response to a physical or mental task, and any other state related to the brain that is discernable using measurement techniques (e.g. fMRI) of the invention.

As an example of an embodiment of the invention, consider a training of a model and subsequent perdition by the model. The training comprises three runs through a virtual reality sequence or video game. fMRI data is obtained from each run, for example, continuous or periodic snapshot fMRI data. Each run is rated on a number of features, for example, continuous features, subjective features (annoyance, sadness and anxiety), and objective features (presentation of objects or representation of objects such as a dog, presentation of visual stimuli such as faces, presentation and/or fulfillment of instructions, and successful completion of tasks or successful responses). After the training, the model is useful in predicting brain or mental states, such as those mentioned above. The training may be performed using data obtained from the same or different subject as the subject undergoing the prediction process (i.e., test subjects). The trained model models brain or mental states of the training subjects or other test subjects.

Aspects of the invention include, for example, a general framework for modeling stimuli-dependent (i.e., context-specific) dynamics of brain. Dependencies between voxels at different time-slices may be modeled, for example, using a dynamic Bayesian network (DBN) model, where dependencies among random variables/voxels follow linear Gaussian models.

An exemplary advantage of the invention is that parameters of the model are not fixed (e.g., parameters in relationship to fMRI, and in relationship to machine-learning using DBNs), but evolve dynamically as functions of external stimuli.

A model, according to an embodiment of the invention, combines underlying brain dynamics with stimuli-related brain dynamics in one model. An exemplary method of the invention for learning or forming such a model may be very efficient and may handle a large number (e.g., hundreds of thousands) of voxels or dimensions via application of sparse regression (i.e., a regression using a parsimonious subset of all available repressors for an efficient prediction of a target variable) using the Lasso method or extensions of Lasso methods, e.g., an elastic network method. The elastic network method is known in the art and described in the paper: Zou, H. and Hastie, T.; *Regularization and Variable Selection via the Elastic-net*; J. R. Statist. Soc. B 2005; vol. 67, pages 301-320, the disclosure of which is incorporated herein by reference. The elastic net or elastic network is a regularization and variable selection method. The elastic net encourages a grouping effect, where strongly correlated predictors tend to be in or out of an associated model together. The elastic net is particularly useful when the number of predictors is much bigger than the number of observations. A least angle regression selection-elastic net (LARS-EN) algorithm can compute elastic net regularization paths efficiently, much like a least angle regression selection (LARS) method or algorithm does for the LARS-EN regression. The LARS method is known in the art and described in the paper: Efron, B., et al.; *Least Angular Regression*; the Annals of Statistics 2004; vol. 32, No. 2, pages 407-499, the disclosure of which is incorporated herein by reference. LARS is a linear model selection algorithm. A LARS algorithm may implement the Lasso method. A LARS algorithm may implement forward stagewise linear regression and use a piecewise linear solution path using a modification of forward stagewise and least angle regression paths. An exemplary advantage of LARS is short computation.

Another exemplary advantage of the invention is interpretability and predictions of the dynamical model that results from application of sparse regression. The model indicates which subsets of voxels or brain areas are most relevant to prediction of the future brain states and/or other variables (e.g., mental states and/or variables associated with: mental, emotional or cognitive states; sensory or other stimulus, e.g., viewing a particular image; or having a certain mental illness).

Exemplary methods of the invention also advance sparse regression methodology by providing learning or forming of dynamically changing subsets of relevant variables, unlike some Lasso and Elastic Network methodologies.

Aspects of the invention consider, for example, regression problems with samples that are not independent and identically distributed (non-i.i.d. samples) that form a multivariate time-series (i.e., a time-series comprising or involving a number of independent mathematical or statistical variables) and use an extension of standard sparse regression methods, for example, the Lasso method, by treating the regression parameters as time-varying random variables. This approach is applied, for example, to the task of predicting brain or mental states from fMRI data.

Advantages of the invention include, for example, a dynamic model that treats fMRI data as a real time-series rather than i.i.d. samples, and allows for dynamically changing parameters as functions of stimuli, other environmental conditions and conditions that are inherent to brain, i.e. allows for a context-specific model of overall brain activity, thus providing a flexible and realistic way of modeling brain. Advantages of the invention also include, for example, efficiency and practicality due to use of sparse regression techniques such as Lasso that provide for high-dimensional time-series. Moreover, sparse models provide for interpretability because sparse models select subsets of variables (voxels) from the past most relevant to prediction of brain activity in the future. Further advantages of the invention include, for example, the stimuli-dependent adaptation of sparse selection providing for identifying specific brain areas that are most predictive of future activity under specific stimuli, rather than trying to learn using stimuli-independent models.

Figure 1:
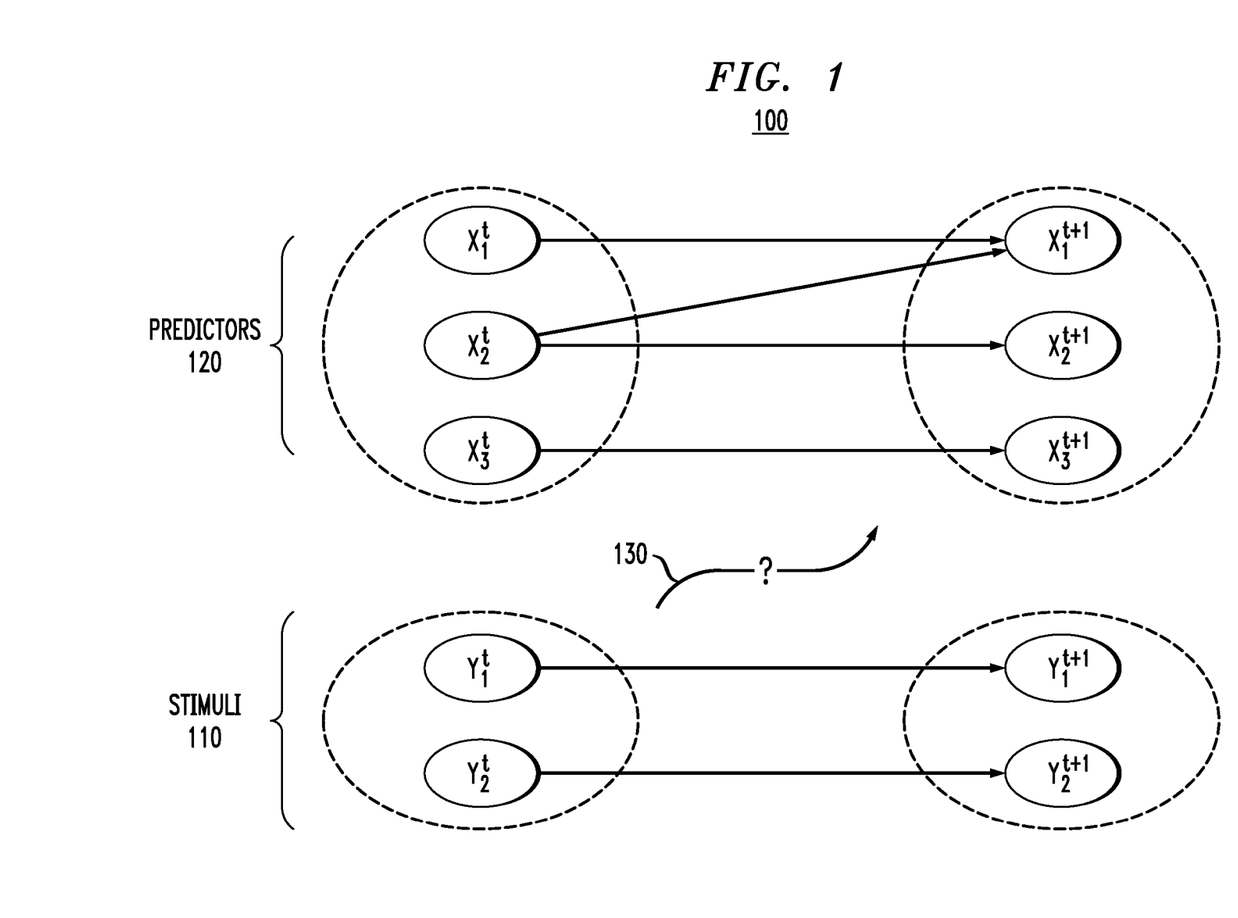
FIG. 1 shows a graphical representation of a regression model as a dynamic Bayesian network, according to an embodiment of the present invention.

The following regression model is used where the coefficients $\beta_{ij}$ are not fixed, but are dynamic functions of the stimuli y: $x_i^{t+1} = \beta_{i0}(y^t) + \beta_{i1}(y^t)x_1^t + \ldots + \beta_{ip}(y^t)x_p^t$ An exemplary graphical representation 100 of the above regression model as a dynamic Bayesian network is shown in FIG. 1, where the independencies, dependencies and relationships between the stimuli 110 and the predictors 120 are not identified as indicated by the indicator 130. In FIGS. 1, 2A, 2B, 2C and 3 and in the text of the specification the variable "x" has the same meaning as "X" and the variable "y" has the same meaning as "Y".

Figure 2A:
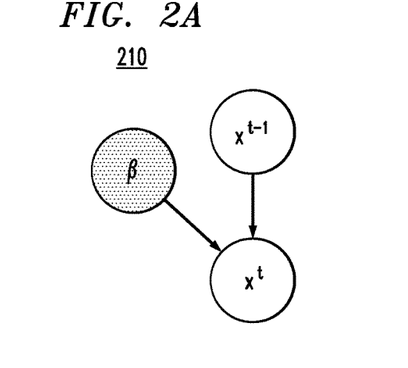
FIGS. 2A-2C are graphical representations comparing a regression approach having fixed parameters with regression approaches having dynamic parameters, according to an embodiment of the present invention.
Figure 2B:
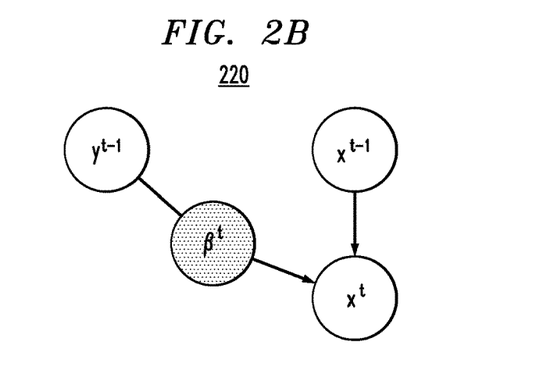
Figure 2C:
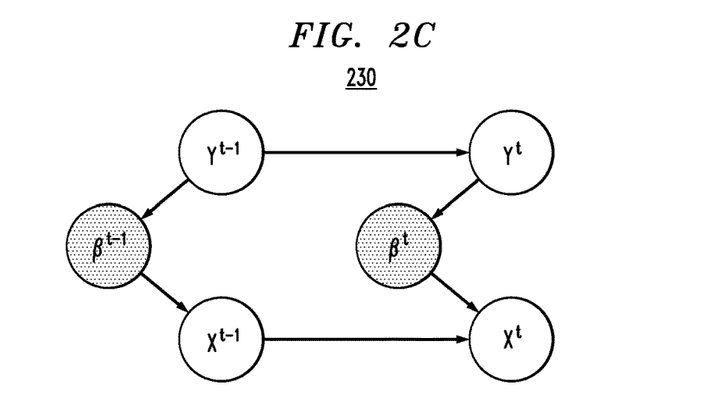

FIGS. 2A, 2B and 2C compare a regression approach having fixed (e.g., not stimulus and not time dependent) parameters β with a dynamic regression method of the invention. FIG. 2A is a graph 210 illustrating a linear regression with fixed parameters β. FIG. 2A may represent, for example, a noisy linear model with fixed parameters β as expressed by the equation below.

$$x_i^{t+1} = \beta_{i0} + \beta_{i1}x_1^t + \ldots + \beta_{ip}x_p^t + \text{noise}$$

Using the Lasso method (maximum likelihood (min–log-likelihood)) with Gaussian noise and prior Laplace transformation on parameters β:

$$\min_{\beta_i} \sum_t (x_i^t - X^{t-1}\beta)^2 + \lambda \sum_{j=1}^p |\beta_{ij}|$$

As the graph 210 shows, $X^t$ is calculated using $X^{t-1}$ and $\beta$.

FIG. 2B is a graph 220 illustrating a dynamic regression with dynamic parameters, according to an embodiment of the invention. Graph 220 of FIG. 2B may represent, for example, a noisy linear model with dynamic parameters $\beta$ as a function $y^t$, i.e., $\beta(y^t)$, expressed by the regression equation below (equation 2B-1). The dynamic parameters $\beta$, besides being expressed as $\beta(y^t)$, may also be expressed as $\beta^t$ or $\beta(y^t)$. The dynamic parameters $\beta$ are coefficients of the regression.

$$x_i^{t+1} = \beta_{i0}(y^t) + \beta_{i1}(y^t)x_1^t + \ldots + \beta_{ip}(y^t)x_p^t + \text{noise} \quad \text{Equation 2B-1:}$$

The dynamic parameters $\beta$ may be dynamically changing as a function of time t and/or y. For example, the dynamic parameters $\beta$ may be an arbitrary function of y. For another example, the dynamic parameter $\beta$ may be represented by a Taylor expansion function (Taylor series) of y as shown in the equation below (equation 2B-2) for dynamic parameters $\beta_{ij}(y)$.

$$\beta_{ij}(y) = \alpha_{0ij} + \alpha_{1ij}y + \alpha_{2ij}y^2 + \quad \text{Equation 2B-2:}$$

The Taylor expansion may be of any order. $\alpha_{0ij}$, $\alpha_{1ij}$, $\alpha_{2ij}$ and other higher order coefficients ($\alpha_{kij}$) are the coefficients of the Taylor expansion. Calculation of the coefficients of the Taylor expansion is well known in the art and, therefore, will not be presented herein.

Substituting $\beta_{ij}(y)$ form the above equation (equation 2B-2) into equation 2B-1, equation 2B-3 is derived.

$$x_i^{t+1} = \alpha_{0i0} + \alpha_{0i1}x_1^t + \ldots + \alpha_{0ip}x_p^t + \quad \text{Equation 2B-3}$$
$$\alpha_{1i0}y + \alpha_{1i1}yx_1^t + \ldots + \alpha_{0ip}yx_p^t + \ldots + \text{noise}$$

Graph 220 and Equation 2B-3 may represent, model or be associated with, for example, a multivariate time-series, a regression with non-i.i.d. samples, the Lasso method, and/or regression parameters considered time-varying and/or random variables. This approach may be applied, for example, to the task of predicting brain or mental states from fMRI data. Equation 2B-3 may model, for example, stimuli-dependent and/or time-dependent brain dynamics.

FIG. 2C is a graph 230 illustrating a dynamic Bayesian network with dynamic Lasso regression, according to an embodiment of the invention. $X^t$ represents voxels and y represents the stimuli. Graph 230 shows that the dynamic parameter $\beta^{t-1}$ is dependent upon or is a function of $Y^{t-1}$. Similarly, graph 230 also shows that the dynamic parameter $\beta^t$ is dependent upon or is a function of $Y^t$. Graph 230 also shows that $X^{t-1}$ is dependent upon or is a function of $\beta^{t-1}$, and that $X^t$ is dependent upon or is a function of fit. Furthermore, graph 230 shows that $Y^t$ is dependent upon or is a function of $Y^{t-1}$, and that $X^t$ is dependent upon or is a function of $X^{t-1}$.

The dynamic parameters $\beta$ change with time (i.e., are time-dependent) resulting from dependency of the dynamic parameters $\beta$ on y (i.e., the stimuli) and the time-dependency of y.

Figure 3:
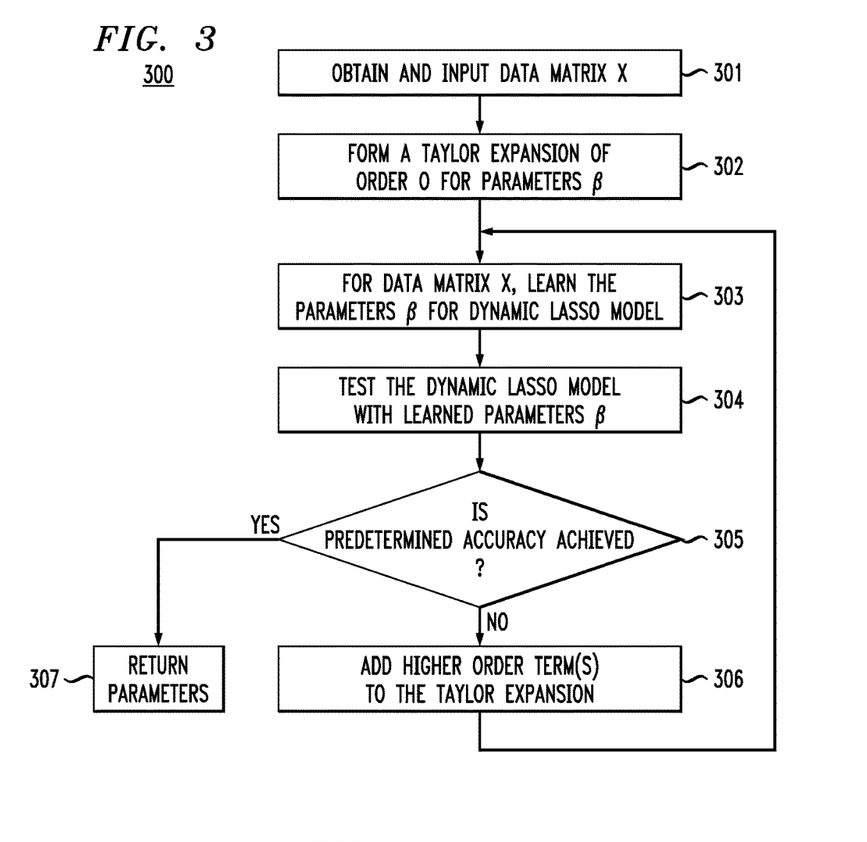
FIG. 3 is a flow diagram of a method for learning or forming dynamic parameters of the dynamic Lasso model, according to an embodiment of the present invention.

FIG. 3 is a flow diagram of a method 300 for learning or forming dynamic parameters $\beta$ of the dynamic Lasso model, according to an embodiment of the invention. Once the dynamic parameters are learned, the dynamic parameters are inserted into the equations of the Lasso model to form a completed Lasso model. Steps of method 300 are shown in an exemplary order. The method may comprise the steps in the shown order or in different orders. Each of the steps may occur one or more times.

The first step 301 of method 300 is obtaining a data matrix X of dimensions N and D (i.e., N×D), where N is the number of time samples and D is the dimensionality of each time sample. For example, the data matrix X has N rows and D columns. In a model learning embodiment of the invention, the data matrix X is a training dataset for learning the dynamic parameters $\beta$ of the model.

By way of example, the data matrix X may comprise fMRI brain scan multivariate time-series data which represent brain states or brain activity. The data matrix X may be produced in response to a stimulus or stimuli. Again by way of example, the stimulus or stimuli may comprise sensory stimulus (e.g., viewing a particular image, smelling a particular odor, hearing a particular sound, tasting a particular flavor, or touching a particular texture, shape or object), performing a particular mental or physical task, having a certain mental illness, or stimulus evoking a particular emotion. In the training embodiment, the stimulus or stimuli is applied to a training entity. In the above example, the training entity may be, for example, a brain or a person having the brain.

The stimuli may be represented by a vector Y of size N×1, e.g., a single row having N entries.

The second step 302 is to form a Taylor expansion of order m for the dynamic parameters $\beta$. The order m of the Taylor expansion may, for example, be chosen arbitrarily or from prior experience. For Taylor expansions having lower orders m, less computation is required. Generally, the higher the order m is, the greater the accuracy of the representation of the dynamic parameters $\beta$ by the Taylor expansion. In order to minimize computation, a relatively low order m may be initially chosen.

The third step 303 is, for the data matrix X, to learn or form the dynamic parameters $\beta$ for the model of the dynamic Lasso method (i.e., the Lasso model). The dynamic parameters $\beta$ may be learned by, for example, LARS, for example, using interactive variable selection. The dynamic parameters $\beta$ may be, for example, a function of $y^t$, i.e., $\beta(y^t)$. One or more of the dynamic parameters $\beta$, for example, may be learned for each time sample and/or for each dimension of data matrix X. The dynamic parameter $\beta$ may be represented by a Taylor expansion of y as shown in the equation 2B-2 for dynamic parameters $\beta_{ij}(y)$, where y represents stimulus or stimuli. The learned dynamic parameters $\beta$ are, at least temporarily, inserted into a portion of the Lasso model (i.e., that portion of the Lasso model that does not include the learned parameters $\beta$) to form an unverified model.

The fourth step 304 is to test the Lasso model having the learned dynamic parameters $\beta$ represented by a Taylor expansion of order m. In particular, the accuracy of the Taylor expansion of order m may be tested. Training data may be used, for example, to test the Lasso model. The Lasso model is applied to the training dataset and stimulus or stimuli to produce or form an accuracy indicator. For example, considering equations 2B-1, 2B-2 and 2B-3, the training data corresponds to $x_i^{t+1}$, $x_1^t$, ... and $x_p^t$, the stimuli corresponds to y, and the parameters $\beta$ correspond to $\beta ij(y)$ given by the Taylor expansion $\beta ij(y) = \alpha_{0ij} + \alpha_{1ij}y + \alpha_{2ij}y^2 + \ldots$. The accuracy indicator reflects, for example, the accuracy of equation 2B-1 or 2B-3 and is a measure of the accuracy of the Taylor expansion 2B-2. The accuracy of the Taylor expansion may be improved by adding higher order terms.

The fifth step 305 determines if a predetermined accuracy has been achieved by comparing the accuracy indicator to the predetermined accuracy threshold. The predetermined accuracy may be a desired accuracy that was previously determined. If the predetermined accuracy is achieved with the learned dynamic parameters β represented by a Taylor expansion of order m, the dynamic parameters are accepted and returned to the Lasso model at a seventh step 307. The method 300 terminates at the seventh step 307.

Returning the model parameters at the seventh step 307 may be considered the final step in forming the model, for example, by providing necessary information to the model. The completed Lasso model is formed by inserting the dynamic parameters into the incomplete Lasso model (i.e., the Lasso model without the returned parameters). As an example, a regression model (i.e., a completed or entire regression model) is formed by inserting the learned regression parameters into the regression equation(s). The regression equation without the learned regression parameters is considered a partial or incomplete model. By way of example only, equation 2B-1 is considered a partial or incomplete model when the dynamic parameters $\beta_{ij}$ are unknown. Once the dynamic parameters $\beta_{ij}$ are learned or known (i.e., $\alpha_{0ij}$, $\alpha_{1ij}$ and $\alpha_{2ij}$ are known) according to equation 2B-2, and the dynamic parameters $\beta_{ij}$ are inserted into equation 2B-1, the model is complete.

If the predetermined accuracy is not achieved with the learned dynamic parameters β represented by a Taylor expansion of order m, one or more higher-order terms are added to the Taylor expansion at the sixth step 306. At the sixth step 306, the order m of the Taylor expansion for the dynamic parameters β is increased by an integer n (m=m+n). n may be, for example, the integer one (1) or an integer greater than one. A new Taylor expansion of this higher order is thus formed. The new higher order becomes the order m of the new Taylor expansion. Increasing the order m of the Taylor expansion is an example of increasing a complexity of the model by increasing a complexity of a dependence of an autoregressive parameter on the stimulus.

After the sixth step 306, the method 300 then returns to the third step 303. Method 300 continues in this manner until the predetermined accuracy is achieved or the method 300 is otherwise terminated. When the predetermined accuracy is achieved, as indicated by the accuracy indicator at or above the predetermined accuracy threshold, the resulting Lasso model comprising the dynamic parameters β represented by the Taylor expansion of final order m is considered to be the verified Lasso model.

The verified Lasso model, or other model, may be applied to a test dataset, obtained by applying the stimulus or stimuli to a test entity, and thus used to predict a mental state of the test entity. In an embodiment of the invention, the stimulus or stimuli applied to the test entity is the same or similar stimulus or stimuli that were applied to the training entity to obtain the training dataset (i.e., data matrix X) in step 301 of method 300. The test entity may be the same as the training entity or different than the training entity.

By way of example, the test dataset may comprise fMRI brain scan multivariate time-series data which represent brain states or brain activity of the test entity, and the stimulus or stimuli may comprise sensory stimulus, performance by the test entity of a particular mental or physical task, having a certain mental illness, or stimulus evoking a particular emotion. The test entity may be, for example, a brain or a person having the brain.

A feature of the proposed method that justifies the term "dynamic Lasso" is that sparsity-enforcing L1-regularization (Lebesgue1-regularization) is added to the regression, like in the non-dynamic Lasso, but in combination with the stimuli-dependent coefficients.

In general, it is assumed that the Taylor expansion described above only includes the elements up to an order m, i.e. $\alpha_{kij}=0$ for k>m. In order to find the parameters of the dynamic Lasso model described above, the following L1-regularized likelihood-maximization problem is solved:

$$\max_{\alpha} P(\alpha \mid X, Y) = \min_{\alpha}[-\log P(X \mid \alpha)P(\alpha)P(Y)]$$

$$= \sum_{t=2}^{n}\sum_{i=1}^{p}\left(x_i^t - \sum_{k=0}^{m}\sum_{j=1}^{p}\alpha_{kij}(y^{t-1})^k x_j^{t-1}\right)^2 +$$

$$\lambda\sum_{i}^{p}\sum_{k=0}^{m}\sum_{j=1}^{p}|\alpha_{kij}|$$

$$= \sum_{i=1}^{p}\left[\sum_{t=2}^{n}\left(x_i^t - \sum_{k=0}^{m}\sum_{j=1}^{p}\alpha_{kij}(y^{t-1})^k x_j^{t-1}\right)^2 +\right.$$

$$\lambda\sum_{k=0}^{m}\sum_{j=1}^{p}|\alpha_{kij}|$$

Herein it is assumed that the data X follow the linear Gaussian model, i.e. that P(X|α) is a joint Gaussian distribution of a vector of independent Gaussian variables $x_i^t$, with unit variance, and that mean P(α) is a Laplace distribution (prior) $\lambda\, e^{\lambda|\alpha_{kij}|}$ with a fixed constant hyper-parameter λ. Note that P(Y), the prior on Y, does not depend on the vector of parameters, α, and thus can be ignored in the above optimization problem.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring again to FIG. 3, which is a flow diagram or flowchart of the method 300, the flowchart and block diagrams in the Figure illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Accordingly, techniques of the invention, for example as depicted in FIGS. 1-4, can also include, as described herein, providing a system, wherein the system includes distinct software modules. By way of example only, the software modules may include: a training data procurement module, a parameter forming module, a model forming module, a training application module, a comparison module, an accuracy module, a test data procurement module and a prediction module. The modules may be adapted, for example, to perform the steps of method 300 illustrated in FIG. 3.

Specifically, the training data procurement module is adapted to obtain a training dataset for training the model by applying a stimulus (or stimuli) to a training entity. The parameter forming module is adapted to form the set of model parameters. The model parameters change with time resulting from dependency of the model parameters on the stimulus (or stimuli) and the time-dependency of the stimulus (or stimuli). The model forming module is adapted to form the model by inserting the formed set of model parameters into at least a portion of the model. The training application module is adapted to apply the model to the training dataset to produce an accuracy indicator for verifying the model. The comparison module is adapted to compare the accuracy indicator with a predetermined accuracy threshold. The accuracy module is adapted to increase a complexity of the model by increasing a complexity of a dependence of an autoregressive parameter on the stimulus (or stimuli) when the accuracy indicator is below the predetermined accuracy threshold. The test data procurement module is adapted to obtain a test dataset by applying the stimulus (or stimuli) to a test entity. The prediction module is adapted to predict a mental state by applying the model to the test dataset and the stimulus (or stimuli).

Figure 4:
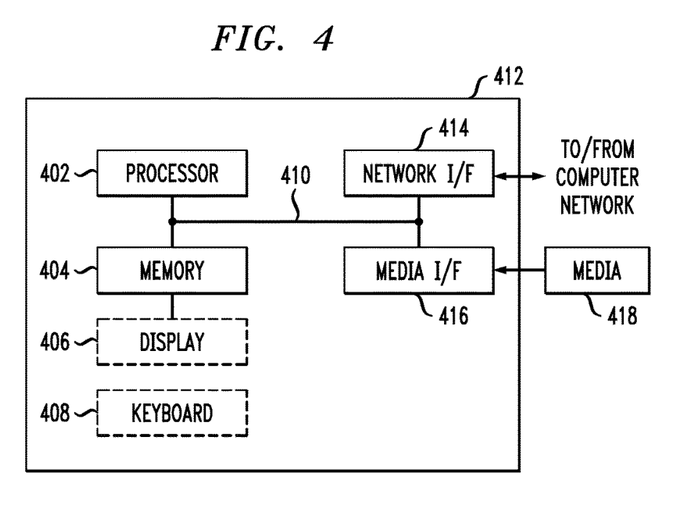
FIG. 4 depicts a computer system that may be useful in implementing one or more aspects and/or elements of the invention.

One or more embodiments can make use of software running on a general purpose computer or workstation. With reference to FIG. 4, such an implementation employs, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, keyboard or mouse), and one or more mechanisms for providing results associated with the processing unit (for example, display or printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

A data processing system suitable for storing and/or executing program code can include at least one processor 402 coupled directly or indirectly to memory elements 404 through a system bus 410. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboard 408, display 406, pointing device, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:
constructing a first model which represents a pattern of neural activity that occurs in regions of a human brain in response to a first type of stimulus applied to the human brain, wherein the first model represents a brain state of a human as a function of the first type of stimulus applied to the human brain, wherein constructing the first model comprises:
scanning the brains of a plurality of test subjects using functional magnetic resonance imaging (fMRI) to obtain a training dataset of fMRI data while the first type of stimulus is being applied to the brains of the test subjects, wherein the training dataset of fMRI data represents neural activity in regions of the brains of the test subjects in response to applied stimulus;

processing the training dataset of fMRI data to form a set of model parameters, wherein at least one model parameter of the set of model parameters is a dynamic model parameter, wherein the dynamic model parameter is defined as a dynamic function of an applied stimulus such that the dynamic model parameter changes based on a type of the applied stimulus, wherein the dynamic model parameter is trained based on a type of the applied stimulus used to obtain the training dataset of fMRI data, wherein the dynamic model parameter comprises at least one coefficient that dynamically changes with time based on (i) a dependency of the dynamic model parameter on the type of the applied stimulus and (ii) a time-dependency of the applied stimulus;

using the set of model parameters to form the first model, such that the first model is configured to represent which regions of a human brain are most predictive of at least one or more stimuli-dependent brain states of the human brain;

wherein the model comprises a regression comprising coefficients, wherein the coefficients of the regression are dependent upon the stimulus and expressed as a Taylor expansion of the stimulus, wherein the coefficients of the regression are dynamic model parameters of the set of model parameters, wherein the dynamic model parameters are indicated by $\beta ij(y)$ and expressed as:

$$\beta ij(y) = \alpha_{0ij} + \alpha_{1ij}y + \alpha_{2ij}y^2 + \ldots;$$

wherein y represents the stimulus; and
wherein $\alpha_{0ij}$, $\alpha_{1ij}$, and $\alpha_{2ij}$ are coefficients of the Taylor expansion and i and j are indexes of the parameters;

utilizing the first model to determine a brain state of an individual, wherein utilizing the model comprises:
acquiring a test dataset of fMRI data for the individual by (i) applying the first type of stimulus to the brain of the individual and (ii) obtaining fMRI data measurements from the brain of the individual in response to the applied stimulus; and
applying the acquired test dataset of fMRI data of the individual to the first model to determine a subset of voxels of the first model which is selected in response to the acquired test dataset of fMRI data, wherein the subset of voxels corresponds to a specific region of the human brain;
determining that the individual has a brain state which corresponds to the human brain state represented by the first model, when the selected subset of voxels of the first model corresponds to an expected subset of voxels of the first model which would be expected to be selected in response to the applied test dataset of fMRI data if the individual had said brain represented by the first model;
wherein the human brain state represented by the first model comprises at least one of a cognitive state and a mental disease state; and constructing a second model which represents a pattern of neural activity that occurs in regions of a human brain in response to a second type of stimulus applied to the human brain, wherein second model represents a brain state of a human as a function of the second type of stimulus applied to the human brain, wherein the second model is constructed by dynamically adjusting the at least one dynamic model parameter of the set of model parameters used to form the first model using a second training dataset of fMRI data which is acquired with the second type of stimulus being applied to the brains of the test subjects;

wherein the method steps are performed by a processor device executing program instructions.

2. The method of claim 1, wherein forming the set of model parameters comprises applying at least one of: (i) a Lasso method, (ii) an elastic network method, (iii) a least angle regression selection-elastic network method, and (iv) a least angle regression selection method.

3. The method of claim 1 further comprising the steps of:
verifying an accuracy of the first model by applying the first model to the training dataset to determine level of accuracy of the first model predicting the human brain state represented by the first model;
comparing the determined level of accuracy with a predetermined accuracy threshold; and
increasing a complexity of the first model by increasing a complexity of a dependence of an autoregressive parameter on the stimulus when the determined level of accuracy is below the predetermined accuracy threshold.

4. The method of claim 3, wherein one or more of the steps of forming the set of model parameters, using the set of model parameters to form the first model, comparing the determined level of accuracy with the predetermined accuracy threshold, and increasing a complexity of the first model, are repeated until the determined level of accuracy is at least one of equal to the predetermined accuracy threshold and above the predetermined accuracy threshold.

5. The method of claim 1, wherein applying the acquired test dataset of fMRI data of the individual to the first model to determine a subset of voxels of the first model which is selected in response to the acquired test dataset of fMRI data comprises applying at least one of: (i) a Lasso method, (ii) an elastic network method, (iii) a least angle regression selection-elastic network method, and (iv) a least angle regression selection method.

6. The method of claim 3, wherein increasing a complexity of the first model comprises adding at least one additional regression coefficient.

7. The method of claim 6, wherein adding the at least one additional regression coefficient comprises adding at least one higher order regression coefficient to the Taylor expansion.

8. A computer program product comprising a computer readable storage medium having computer readable program code embodied therewith, the computer readable program code comprising computer readable program code configured to perform the steps of:
constructing a first model which represents a pattern of neural activity that occurs in regions of a human brain in response to a first type of stimulus applied to the human brain, wherein the first model represents a brain state of a human as a function of the first type of stimulus applied to the human brain, wherein constructing the first model comprises:
scanning the brains of a plurality of test subjects using functional magnetic resonance imaging (fMRI) to obtain a training dataset of fMRI data while the first type of stimulus is being applied to the brains of the test subjects, wherein the training dataset of fMRI data represents neural activity in regions of the brains of the test subjects in response to applied stimulus;
processing the training dataset of fMRI data to form a set of model parameters, wherein at least one model parameter of the set of model parameters is a dynamic model parameter, wherein the dynamic model parameter is defined as a dynamic function of an applied stimulus such that the dynamic model parameter changes based on a type of the applied stimulus, wherein the dynamic model parameter is trained based on a type of the applied stimulus used to obtain the training dataset of fMRI data, wherein the dynamic model parameter comprises at least one coefficient that dynamically changes with time based on (i) a dependency of the dynamic model parameter on the type of the applied stimulus and (ii) a time-dependency of the applied stimulus;
using the set of model parameters to form the first model, such that the first model is configured to represent which regions of a human brain are most predictive of at least one or more stimuli-dependent brain states of the human brain;
wherein the model comprises a regression comprising coefficients, wherein the coefficients of the regression are dependent upon the stimulus and expressed as a Taylor expansion of the stimulus, wherein the coefficients of the regression are dynamic model parameters of the set of model parameters, wherein the dynamic model parameters are indicated by βij(y) and expressed as:

$$\beta_{ij}(y)=\alpha_{0ij}+\alpha_{1ij}y+\alpha_{2ij}y^2+\ldots;$$

wherein y represents the stimulus; and
wherein $\alpha_{0ij}$, $\alpha_{1ij}$, and $\alpha_{2ij}$ are coefficients of the Taylor expansion and i and j are indexes of the parameters;
utilizing the first model to determine a brain state of an individual, wherein utilizing the model comprises:
acquiring a test dataset of fMRI data for the individual by (i) applying the first type of stimulus to the brain of the individual and (ii) obtaining fMRI data measurements from the brain of the individual in response to the applied stimulus; and
applying the acquired test dataset of fMRI data of the individual to the first model to determine a subset of voxels of the first model which is selected in response to the acquired test dataset of fMRI data, wherein the subset of voxels corresponds to a specific region of the human brain;
determining that the individual has a brain state which corresponds to the human brain state represented by the first model, when the selected subset of voxels of the first model corresponds to an expected subset of voxels of the first model which would be expected to be selected in response to the applied test dataset of fMRI data if the individual had said brain represented by the first model;
wherein the human brain state represented by the first model comprises at least one of a cognitive state and a mental disease state; and
constructing a second model which represents a pattern of neural activity that occurs in regions of a human brain in response to a second type of stimulus applied to the human brain, wherein second model represents a brain state of a human as a function of the second type of stimulus applied to the human brain, wherein the second model is constructed by dynamically adjusting the at least one dynamic model parameter of the set of model parameters used to form the first model using a second training dataset of fMRI data which is acquired with the second type of stimulus being applied to the brains of the test subjects.

9. The computer program product of claim 8, wherein forming the set of model parameters comprises applying at least one of: (i) a Lasso method, (ii) an elastic network method, (iii) a least angle regression selection-elastic network method, and (iv) a least angle regression selection method.

10. The computer program product of claim 8, further comprising the steps of:
verifying an accuracy of the first model by applying the first model to the training dataset to determine level of accuracy of the first model predicting the human brain state represented by the first model;
comparing the determined level of accuracy with a predetermined accuracy threshold; and
increasing a complexity of the first model by increasing a complexity of a dependence of an autoregressive parameter on the stimulus when the determined level of accuracy is below the predetermined accuracy threshold.

11. The computer program product of claim 10, wherein one or more of the steps of forming the set of model parameters, using the set of model parameters to form the first model, comparing the determined level of accuracy with the predetermined accuracy threshold, and increasing a complexity of the first model, are repeated until the determined level f accuracy is at least one of equal to the predetermined accuracy threshold and above the predetermined accuracy threshold.

12. The computer program product of claim 8, wherein applying the acquired test dataset of fMRI data of the individual to the first model to determine a subset of voxels of the first model which is selected in response to the acquired test dataset of fMRI data comprises applying at least one of: (i) a Lasso method, (ii) an elastic network method, (iii) a least angle regression selection-elastic network method, and (iv) a least angle regression selection method.

13. The computer program product of claim 10, wherein increasing a complexity of the first model comprises adding at least one additional regression coefficient.

14. The computer program product of claim 13, wherein adding the at least one additional regression coefficient comprises adding at least one higher order regression coefficient to the Taylor expansion.

15. Apparatus comprising:
a memory configured to store program instructions; and
a processor coupled to the memory, operative to process the stored program instructions to implement a process comprising:
constructing a first model which represents a pattern of neural activity that occurs in regions of a human brain in response to a first type of stimulus applied to the human brain, wherein the first model represents a brain state of a human as a function of the first type of stimulus applied to the human brain, wherein constructing the first model comprises:
scanning the brains of a plurality of test subjects using functional magnetic resonance imaging (fMRI) to obtain a training dataset of fMRI data while the first type of stimulus is being applied to the brains of the test subjects, wherein the training dataset of fMRI data represents neural activity in regions of the brains of the test subjects in response to applied stimulus;
processing the training dataset of fMRI data to form a set of model parameters, wherein at least one model parameter of the set of model parameters is a dynamic model parameter, wherein the dynamic model parameter is defined as a dynamic function of an applied stimulus such that the dynamic model parameter changes based on a type of the applied stimulus, wherein the dynamic model parameter is trained based on a type of the applied stimulus used to obtain the training dataset of fMRI data, wherein the dynamic model parameter comprises at least one coefficient that dynamically changes with time based on (i) a dependency of the dynamic model parameter on the type of the applied stimulus and (ii) a time-dependency of the applied stimulus;
using the set of model parameters to form the first model, such that the first model is configured to represent which regions of a human brain are most predictive of at least one or more stimuli-dependent brain states of the human brain;
wherein the model comprises a regression comprising coefficients, wherein the coefficients of the regression are dependent upon the stimulus and expressed as a Taylor expansion of the stimulus, wherein the coefficients of the regression are dynamic model parameters of the set of model parameters, wherein the dynamic model parameters are indicated by $\beta_{ij}(y)$ and expressed as:

$$\beta_{ij}(y)=\alpha_{0ij}+\alpha_{1ij}y+\alpha_{2ij}y^2+\ldots;$$

wherein y represents the stimulus; and
wherein $\alpha_{0ij}$, $\alpha_{1ij}$, and $\alpha_{2ij}$ are coefficients of the Taylor expansion and i and j are indexes of the parameters;
utilizing the first model to determine a brain state of an individual, wherein utilizing the model comprises:
acquiring a test dataset of fMRI data for the individual by (i) applying the first type of stimulus to the brain of the individual and (ii) obtaining fMRI data measurements from the brain of the individual in response to the applied stimulus; and
applying the acquired test dataset of fMRI data of the individual to the first model to determine a subset of voxels of the first model which is selected in response to the acquired test dataset of fMRI data, wherein the subset of voxels corresponds to a specific region of the human brain;
determining that the individual has a brain state which corresponds to the human brain state represented by the first model, when the selected subset of voxels of the first model corresponds to an expected subset of voxels of the first model which would be expected to be selected in response to the applied test dataset of fMRI data if the individual had said brain represented by the first model;
wherein the human brain state represented by the first model comprises at least one of a cognitive state and a mental disease state; and
constructing a second model which represents a pattern of neural activity that occurs in regions of a human brain in response to a second type of stimulus applied to the human brain, wherein second model represents a brain state of a human as a function of the second type of stimulus applied to the human brain, wherein the second model is constructed by dynamically adjusting the at least one dynamic model parameter of the set of model parameters used to form the first model using a second training dataset of fMRI data which is acquired with the second type of stimulus being applied to the brains of the test subjects.

* * * * *